United States Patent
DeBates

(10) Patent No.: US 10,120,497 B1
(45) Date of Patent: Nov. 6, 2018

(54) REDUCING POWER CONSUMPTION IN A MOBILE STYLUS SYSTEM

(71) Applicant: Motorola Mobility LLC, Chicago, IL (US)

(72) Inventor: Scott Patrick DeBates, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/499,609

(22) Filed: Apr. 27, 2017

(51) Int. Cl.
*G06F 3/041* (2006.01)
*G06F 3/0354* (2013.01)
*G06F 3/044* (2006.01)

(52) U.S. Cl.
CPC ........ *G06F 3/0416* (2013.01); *G06F 3/03545* (2013.01); *G06F 3/044* (2013.01); *G06F 2203/0384* (2013.01)

(58) Field of Classification Search
None
See application file for complete search history.

(56) References Cited

U.S. PATENT DOCUMENTS

| | | | | |
|---|---|---|---|---|
| 8,878,823 | B1* | 11/2014 | Kremin | G06F 3/03545 345/179 |
| 2014/0267078 | A1* | 9/2014 | Kukulski | G06F 3/0416 345/173 |
| 2015/0277587 | A1* | 10/2015 | Chandran | G06F 3/0416 345/173 |
| 2017/0285771 | A1* | 10/2017 | Jung | G06F 3/0383 |

* cited by examiner

*Primary Examiner* — Kenneth B Lee, Jr.
(74) *Attorney, Agent, or Firm* — Wolfe-SBMC

(57) ABSTRACT

Various embodiments reduce power consumption in a mobile stylus system by selectively scanning only a subset of capacitive lines in a capacitive sensing panel when a received input is determined to be provided by a finger. When the input is determined to be from a stylus, a larger number of capacitive lines can be scanned. Thus, power savings are achieved because less capacitive lines are scanned when the input is determined to be provided by a finger.

20 Claims, 7 Drawing Sheets

REDUCING POWER CONSUMPTION IN A MOBILE STYLUS SYSTEM

BACKGROUND

Portable devices, such as mobile phones, tablet devices, digital cameras, and other types of computing and electronic devices may be designed with a touchscreen for user input with a stylus or touch contact. Typically, a user can contact the touchscreen of a device to access the functionality of the device. For example, touchscreen contact may be used to open, close, and use applications, or to modify device settings. In general, two types of styluses may be used to provide input to a touchscreen—a passive stylus and an active stylus.

The data captured by a conventional touchscreen that is used with a passive stylus generally only indicates whether the stylus is contacting the touchscreen and, if so, the x-y position of the stylus on the touchscreen.

In contrast, an active stylus is a powered input device that can, among other functions, measure contact pressure between the stylus and the touchscreen, and provide that information to the device to help distinguish between contact and hovering. However, to measure and transmit this data, as well as to produce and transmit other data, an active stylus requires a battery or other power source inside the stylus.

The use of a stylus in touchscreen scenarios enables information to be captured at a higher level of precision than, for example, input provided by a finger. This is because the contact footprint of a stylus is typically much smaller than the contact footprint of a finger. Higher input precision, however, requires finer precision in the sensing circuitry. Yet, the higher input precision that comes with sensing circuitry that is finer in its sensing precision is often unnecessary when the touch input is received from a finger, whose contact footprint is much larger than the contact footprint of the stylus. This unnecessary input sensing precision can, and often does, lead to wasteful power consumption by the computing device. That is, if the touch input is received from a finger, then using the finer sensing precision that is more fitting for stylus input is not necessary.

BRIEF DESCRIPTION OF THE DRAWINGS

Embodiments for reducing power consumption in a mobile stylus system are described with reference to the following Figures. The same numbers may be used throughout to reference like features and components that are shown in the Figures.

DETAILED DESCRIPTION

Overview

Touchscreen panels are typically incorporated in various electronic devices to detect a user input (i.e., user touch or hover, or stylus touch or hover) and to display content. The touchscreen panel includes an active portion capable of detecting the user touch/hover and displaying content. This active portion is typically formed from a display panel on top of which a capacitive sensing panel is provided which includes multiple layers of capacitive sensing circuitry arranged in a pattern, such as a grid.

As noted above, the use of a stylus in touchscreen scenarios enables information to be captured at a higher level of precision than, for example, input provided by a finger. However, employing sensing techniques that are used for stylus input is typically wasteful of power resources when the input is by way of a user's finger.

Various embodiments reduce power consumption in a mobile stylus system by selectively scanning only a subset of capacitive lines in a capacitive sensing panel when a received input is determined to be provided by a finger. When the input is determined to be from a stylus, a larger number of capacitive lines can be scanned. Thus, power savings are achieved because less capacitive lines are scanned when the input is determined to be provided by a finger.

While features and concepts for reducing power consumption in a mobile stylus system can be implemented in any number of different devices, systems, environments, and/or configurations, embodiments for reducing power consumption in a mobile stylus system are described in the context of the following example devices, systems, and methods.

Example Operating Environment

Figure 1:
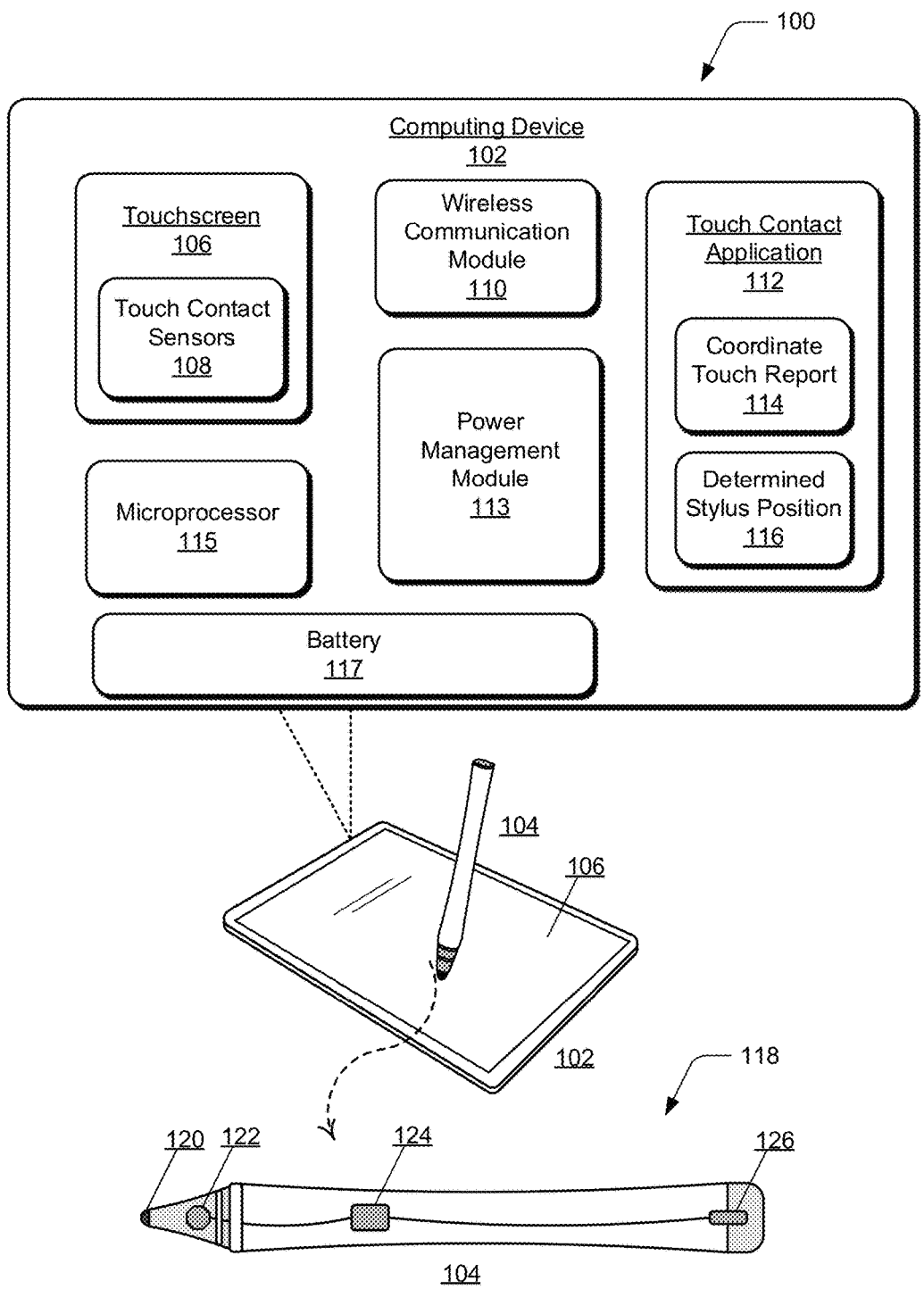
FIG. 1 illustrates an example mobile stylus system in which power consumption reduction embodiments can be implemented.

FIG. 1 illustrates an example mobile stylus system 100 in which embodiments for reducing power consumption can be implemented. The example mobile stylus system 100 includes a computing device 102, also referred to as a mobile device, and a stylus 104. The computing device 102 may be any type of device that includes an integrated touchscreen 106 implemented for touch contact inputs, such as with the stylus 104 or finger contact. The computing device 102 may be any type of a mobile phone, tablet device, digital camera, multimedia device, or other types of computing and electronic devices. In this example, the computing device 102 implements components and features of the touchscreen 106, including touch contact sensors 108, such as a capacitive sensing panel described below in more detail. The touchscreen 106 can be utilized by a user of the computing device 102, and the touch contact sensors 108 detect user touch contact inputs that allow the user to interact with the device, as well as with programs and applications installed on the device. The computing device 102 can also be implemented with additional, various components, such as a processing system and memory, and any number and combination of components as further described with reference to the example device shown in FIG. 5.

In this example mobile stylus system 100, the computing device 102 also includes a wireless communication module 110 and a touch contact application 112 that is implemented to generate a coordinate touch report 114 and a determined stylus position 116 of the stylus 104 on the touchscreen 106. The wireless communication module 110 enables the computing device 102 to wirelessly communicate with stylus 104, as described below in more detail. The wireless communication module can employ any suitable type of technology to enable communication with stylus 104 including, by way of example and not limitation, Bluetooth, Wi-Fi, RFID (both active and passive), cellular, RSSI (Received Signal Strength Indication) and the like. The touch contact application 112 can be implemented as a software application or module, such as executable software instructions (e.g., computer-executable instructions) that are executable with a processing system of the computing device. The touch contact application 112 can be stored on computer-readable storage memory (e.g., a memory device), such as any suitable memory device or electronic data storage implemented in the computing device.

The coordinate touch report 114 is generated to indicate the x-y coordinate position of each user touch contact or gesture contact. The determined stylus position 116 can include the coordinate touch report 114, as well as data describing the tilt angle, velocity, and/or motion direction of the stylus 104.

Computing device 102 also includes a power management module 113, a microprocessor 115, and a battery 117.

The power management module 113 is representative of functionality that enables power management techniques described herein. The power management module 113 may be implemented using any of one or more processors (e.g., a microprocessor, a controller, a computing core, or a combination thereof) or processing systems with storage memory having processor-executable instructions that are fixed, hardware-encoded, programmable, alterable, wirelessly-receivable, or a combination thereof. The power management module 113 can be implemented as an application-specific integrated circuit (ASIC), a field-programmable gate array (FPGA), a complex programmable logic device (CPLD), an application-specific standard product (ASSP), a system on-a-chip (SoC), a silicon-based processing unit, or as some combination thereof. Generally, an integrated circuit can be designed with hardware along with one or more of software, firmware, or fixed logic circuitry that is implemented in connection with processing or control circuits.

The microprocessor 115 is representative of functionality that executes operations to enable the computing device to operate to perform various tasks including, by way of example and not limitation, the power management techniques described herein.

An example 118 illustrates an implementation of the stylus 104. The stylus 104 can be implemented as a passive stylus or an active stylus. A "passive" stylus does not use its own power to actively send a signal to the touchscreen to indicate its position, but is instead passively detected by the touchscreen. An "active" stylus uses its own power, as supplied by a battery, to send data and information to computing device 102.

In this example, the stylus 104 includes a conductive tip 120 that is designed for touch contact to interact with the touchscreen 106 of the computing device 102. The stylus 104 also includes a pressure sensor 122 that senses applied pressure when the conductive tip 120 contacts a surface of the touchscreen, such as when a user applies pressure to contact the touchscreen with the stylus. In implementations, the pressure sensor 122 is a multi-axis pressure sensor, and pressure sensor data is used by the computing device 102 to provide a PC keyboard track pointer experience when the conductive tip of the stylus is firmly contacting the surface of the touchscreen. The stylus also includes a wireless communication module 124 that enables communication with wireless communication module 110 of the computing device 102. In instances where wireless communication module 124 is implemented using RFID technology, such as by including an RFID tag, the stylus 104 can include at least one RFID antenna 126. The RFID tag can be implemented to receive pressure sensor data from the pressure sensor 122 when the stylus 104 is used as an input device and the conductive tip 120 contacts the surface of the touchscreen of the computing device 102. In this example, the RFID antenna 126 of the RFID tag is positioned within the stylus 104, such as in the top end of the stylus, so that the antenna is not detuned when a user holds the stylus for use. Optionally, the stylus 104 can include an additional RFID antenna (not shown) that is positioned at the end of the stylus opposite of the first RFID antenna 126 to prevent interference with reading the RFID tag 124.

Having considered an example computing device and stylus, consider now an example capacitive sensing panel in accordance with one or more embodiments.

Example Capacitive Sensing Panel

Figure 2:
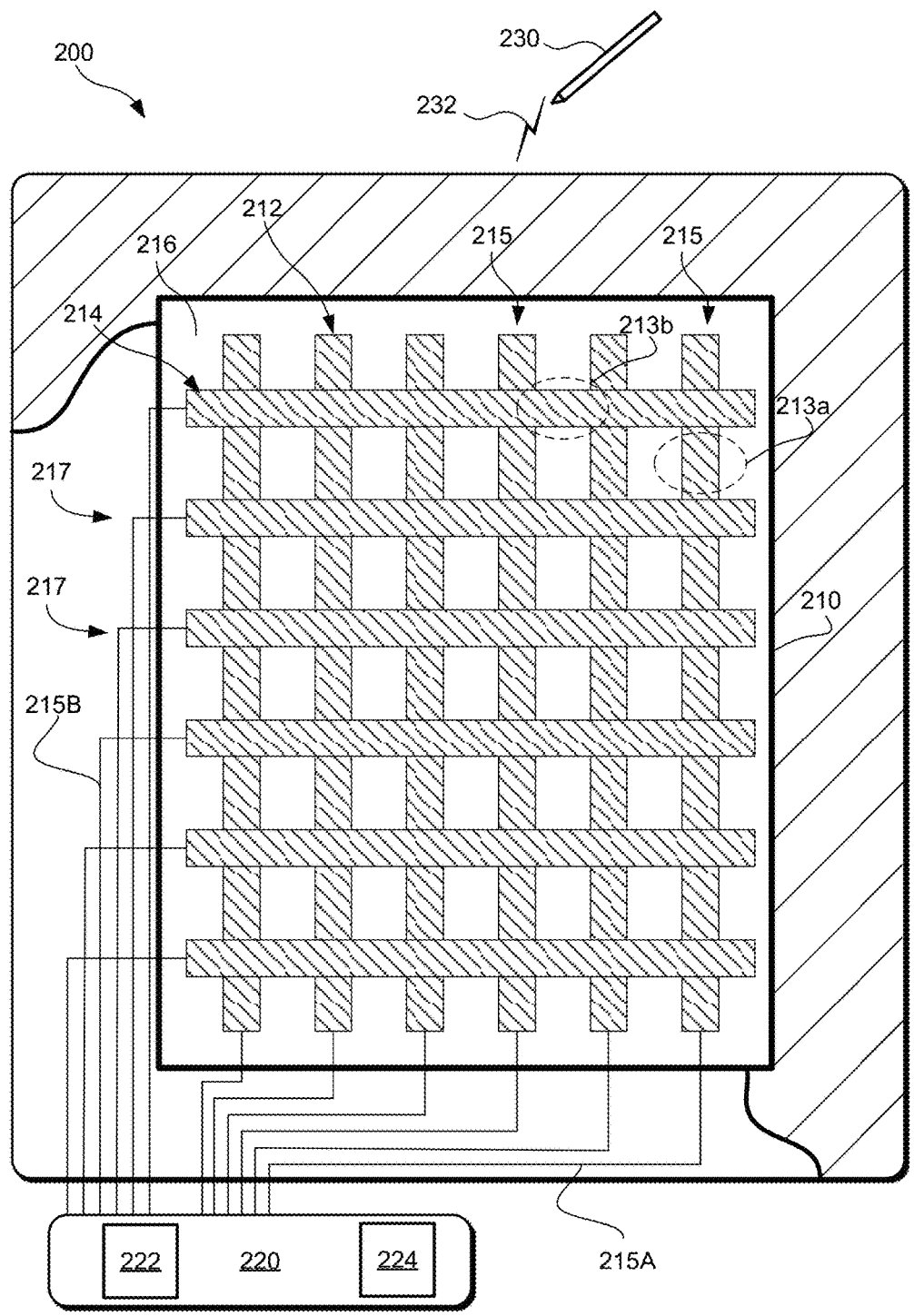
FIG. 2 illustrates an example capacitive sensing panel in accordance with one or more embodiments.

FIG. 2 illustrates a portion of a capacitive sensing panel 200 utilizing a grid-shaped pattern. It is to be appreciated and understood, that the capacitive sensing panel 200 is shown for illustrative purposes only. Other grid-shaped patterns can be utilized without departing from the spirit and scope of the claimed subject matter.

The capacitive sensing panel 200 is of a type useful for a touchscreen panel for an electronic device such as a smart phone, GPS device, tablet computer, mobile media player, remote control device, or any other device capable of using a touchscreen panel. The capacitive sensing panel 200 includes an active portion 210 including a sensor pattern configured to assist in the detection of a user touch or hover (for example, through a finger or other body part, as well as through a tool such as a stylus).

The capacitive sensing panel 200 is formed from multiple indium tin oxide (ITO) layers, namely, a first ITO layer 212 and a second ITO layer 214, disposed within the perimeter of the active portion 210. The first and second ITO layers 212 and 214 are separated by a dielectric layer 216. The first ITO layer 212 is patterned to include columns 215 (also referred to as "lines" or "capacitive lines") of interconnected capacitive-sensing nodes 213a (indicated by the dashed oval), and a first layer of traces 215A coupled to each column of capacitive-sensing nodes in the first ITO layer 212. The interconnected nodes of any one column 215 are isolated from the interconnected nodes of any adjacent column 215. The second ITO layer 214 is patterned to include rows 217 (also referred to as "lines" or "capacitive lines") of interconnected capacitive-sensing nodes 213b (indicated by the dashed oval), and a second layer of traces 215B coupled to each row 217 of capacitive-sensing nodes in the second ITO layer 214. The interconnected nodes of any one row 217 are isolated from the interconnected nodes of any adjacent row 217.

In some implementations, the interconnected nodes can have an interleaved structure of the row and column patterns to occupy a large surface area of the active portion 210. So, for example, the space between four interconnected nodes 213b in two adjacent rows 217 may be occupied by one node 213a of a given column. Conversely, the space between four interconnected nodes 213a in two adjacent columns 215 may be occupied by one node 213b of a given row 217.

The first and second layers of traces 215A and 215B couple each respective row or column of capacitive-sensing nodes to control circuitry 220. The control circuitry 220 may include drive and sense circuitry coupled to the traces 215A and/or 215B. For example, drive circuitry may be used to apply a signal to a trace 215A for a certain column, and sense circuitry may be used to sense a signal or scan on a trace 215B for a certain row. The opposite application of applying and sensing signals may, of course, also be provided using the control circuitry 220.

In one or more embodiments, the capacitive sensing panel 200 may be operated in different modes. A first mode, referred to as a "self-capacitance mode", configures the control circuitry 220 to sense the capacitance between any given column or row of interconnected nodes and a surrounding panel reference (for example, ground). By sensing a change in self-capacitance for a given column or row of interconnected nodes, the control circuitry 220 may detect a user touch or hover at or near that given column or row of interconnected nodes.

A second mode, referred to as the "mutual-capacitance mode", configures the control circuitry 220 to sense the capacitance at an intersection point between one column of interconnected nodes and one row of interconnected nodes. By sensing a change in mutual-capacitance at a given intersection point between a column and row of interconnected nodes, the control circuitry 120 may detect a user touch or hover at or near that given intersection point.

As noted above, a stylus 230 can also be used with the capacitive sensing panel 200. In a passive operating mode, the stylus 230 functions in a manner analogous to a user finger with respect to interacting with the capacitive sensing panel 200. In this regard, a change in capacitance (either self or mutual) is detected in response to the touch or hover of the stylus 230. In an active operating mode, however, the stylus 230 is configured to generate a signal 232 which can modify the charge on the nodes of the capacitive sensing panel by means of capacitive coupling. If the stylus signal 232 is modulated by information (data), then the charge of the nodes will likewise be modulated in accordance with that information and the modulated change in charge at the nodes can be detected (sensed) by the control circuitry 220 to recover the information sent by the stylus 230 in the signal 232. In the illustrated and described example, the control circuitry 220 includes a first circuit 222 which configures the columns 215 and rows 217 of interconnected capacitive-sensing nodes to provide for mutual-capacitance sensing, and a second circuit 224 which configures the columns 215 and rows 217 of interconnected capacitive-sensing nodes to provide for self-capacitance sensing. Mutual-capacitance sensing and self-capacitance scanning can take place during different periods, which can be for the same or for a different duration.

The control circuitry 220 can be configured to drive a signal on the interconnected nodes of the columns 215 and/or rows 217 of the capacitive sensing panel to place a charge on the nodes which are capacitively coupled to the stylus. If the control circuitry signal is modulated by information (data), then the charge of the nodes will likewise be modulated in accordance with that information and the modulated change in charge at the nodes can be detected (sensed) by the active stylus 230 to recover the information sent by the control circuitry 220.

It is thus possible for the control circuitry 220 and active stylus 230 to engage in a bidirectional communication. Establishing a protocol governing such a bidirectional communication is important to supporting a cooperative relationship between the control circuitry and the active stylus 230. It is also important that the protocol support operation of the capacitive sensing panel 200 in non-stylus operations, such as detecting a user finger or hover, in a manner that is perhaps simultaneously with active stylus communication. It is further important that the protocol support operation of the capacitive sensing panel 200 with respect to communicating with a plurality of active styluses.

Having considered an example capacitive sensing panel, consider now example power consumption reduction techniques in accordance with one or more embodiments.

Example Power Consumption Reduction Techniques

As noted above, the use of a stylus in touchscreen scenarios enables information to be captured at a higher level of precision than, for example, input provided by a finger. However, employing sensing techniques that are used for stylus input is typically wasteful of power resources when the input is by way of a user's finger.

In the illustrated and described embodiment, power consumption reduction is achieved by scanning different numbers of rows or columns, i.e. "lines", depending on whether the computing device is in a "finger mode" or a "pen mode."

A finger mode corresponds to an input that is provided by a user's finger. A pen mode, on the other hand, corresponds to an input that is provided by a stylus. When the computing device is in the finger mode, less lines, i.e. rows and columns, can be scanned than when the computing device is in the pen mode. The reason for this is that in the finger mode, the so-called input footprint that is "seen" by the capacitive sensing panel 200 is larger than the input footprint that is "seen" by the capacitive sensing panel 200 when the input is from the stylus. Thus, in the finger mode, less lines need to be scanned to ascertain the input. In the pen mode, more lines can be scanned to provide more granular input with respect to the stylus input.

Figure 3:
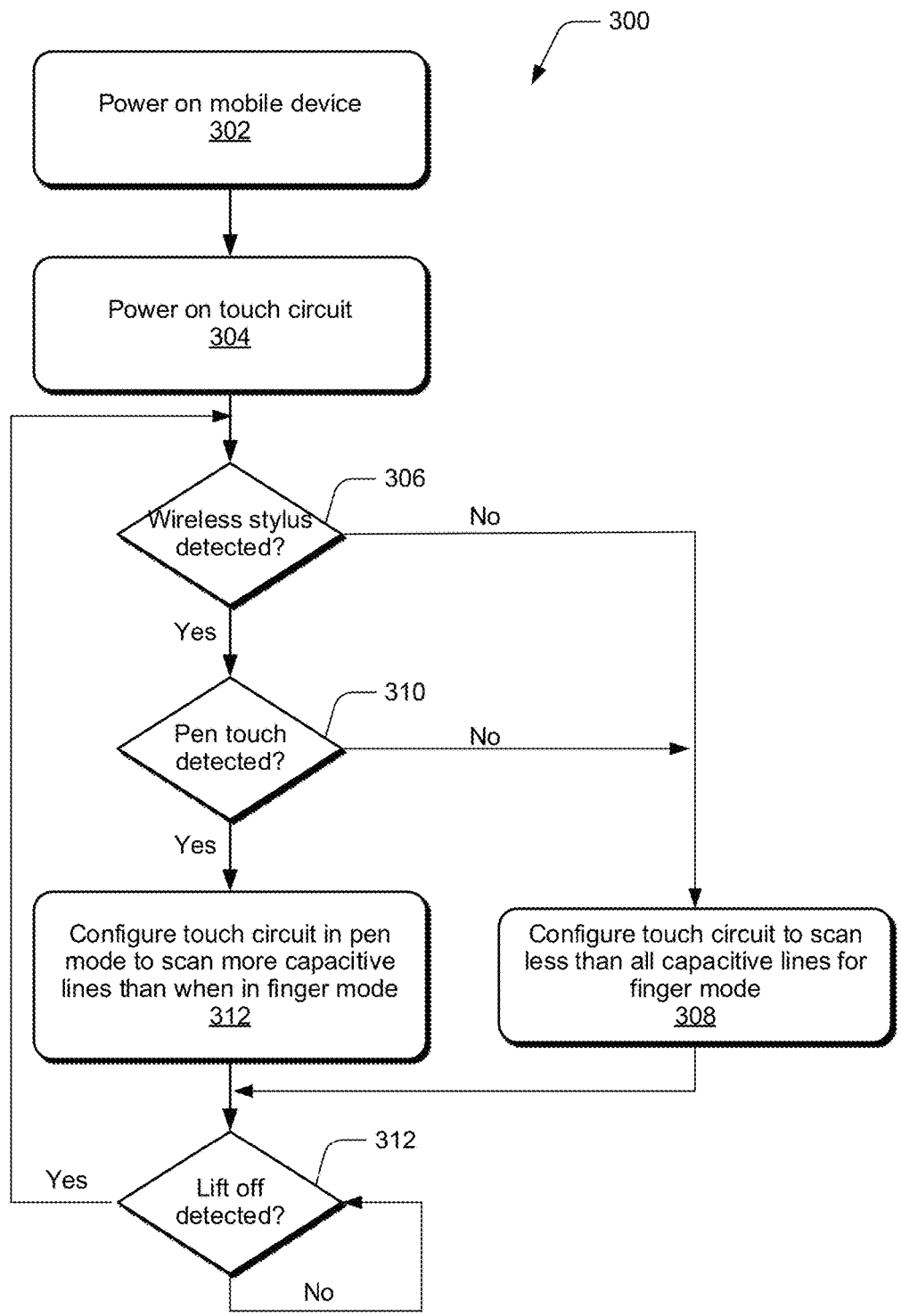
FIG. 3 illustrates a flow diagram that describes operations in accordance with one or more embodiments.

FIG. 3 illustrates an example method 300 of reducing power consumption in a mobile stylus system in accordance with one or more embodiments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the method is described is not intended to be construed as a limitation, and any number or combination of the described method operations can be performed in any order to perform a method, or an alternate method.

At 302, the mobile device is powered on and, at 304, the touch circuit is powered on. The touch circuit can include a touchscreen, such as touchscreen 106 (FIG. 1) and touch contact sensors 108. The touch contact sensors can include any configuration of touch sensors including, by way of example and not limitation, capacitive sensing panel 200.

At 306, a determination is made as to whether a wireless stylus is detected. The wireless stylus can be detected in any suitable way. For example, various different technologies can be employed to detect the wireless stylus including, by way of example and not limitation, Bluetooth, Wi-Fi, RFID, cellular, and the like. If a wireless stylus is not detected, the touch circuit is configured to scan less than all capacitive lines for finger mode, at 308. That is, in the absence of a detected stylus, an assumption is made that any touch input that is to be received will be received by way of a user's finger. Scanning less than all the capacitive lines conserves power because all of the lines are not scanned. Any suitable configuration of less than all of the capacitive lines can be scanned. For example, in some embodiments, every other line in each row and each column can be scanned. In yet other embodiments, different combinations of lines in each row and each column can be scanned. For example, two adjacent lines might be scanned while the next two adjacent lines may not be scanned. Scanning in the finger mode can also be performed and can accommodate the self-capacitance mode and the mutual-capacitance mode, as described above.

If, on the other hand, a wireless stylus is detected at 306, a determination is made as to whether a pen touch is detected at 310. If a pen touch is not detected, but rather a finger touch is detected, the touch circuit is configured to scan less than all capacitive lines for finger mode, at 308. Ascertaining the difference between a pen touch and a finger touch can be performed utilizing any suitable algorithm. In at least some embodiments, the size of the input footprint can be ascertained and then a determination can be made as to whether the input footprint corresponds to a pen touch (i.e., a small input footprint) or a finger touch (i.e. a larger input footprint). This might correspond to a situation in which the user has activated the stylus but has not used the stylus to touch the mobile device display. Rather, the user may simply choose to provide touch-based input by way of a finger.

If, on the other hand, at 310, a pen touch is detected, the touch circuit is configured in pen mode to scan more capacitive lines than when in the finger mode, at 312. Any suitable number of capacitive lines can be scanned. For example, if N lines are scanned in finger mode, then N+M lines can be scanned, where M is an integer. In at least some embodiments, scanning N+M lines results in all of the capacitive lines being scanned. Scanning in the pen mode can also be performed and can accommodate the self-capacitance mode and the mutual-capacitance mode, as described above. The method then proceeds to determine whether a lift off of the touch input has been detected. If no lift off is detected, the method continues to monitor for a lift off event. If, on the other hand, a lift off occurs, the method returns to 306 to ascertain whether the wireless stylus is detected, and continues as described above.

Having considered an example method in accordance with one or more embodiments, consider now various extensions that can be employed in connection with the above-described embodiments.

Power Consumption Reduction Extensions

Figure 3A:
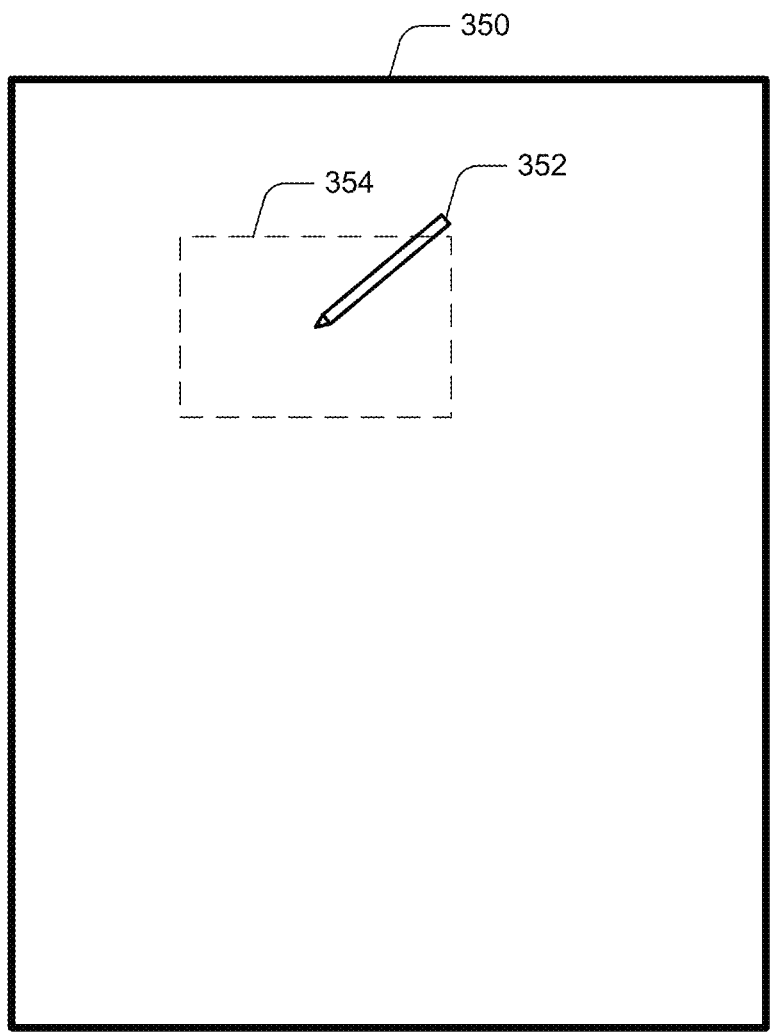
FIGS. 3A and 3B illustrate an active portion of a corresponding sensor panel in accordance with one or more embodiments.

In the above-described embodiments, power savings are achieved by scanning less capacitive lines when the corresponding device is in finger mode, as opposed to the number of capacitive lines that are scanned when the device is in pen mode. In at least some embodiments, the number of capacitive lines that are scanned can be even further reduced if the region of touch input is taken into account. As an example, consider FIG. 3A, which represents an active portion 350 of a corresponding capacitive sensing panel. In this example, a stylus 352 has been touched down on active portion 350. When the stylus 352 (or alternatively, a finger) is touched down, the location of the touch input is determined by the computing device. The location of touch down can then be used to define a region, such as region 354, within which the touch down occurs. Once this region is defined, capacitive lines having portions that lie within this region can be scanned, while capacitive lines that lie outside this region are not scanned. In this particular embodiment, an assumption is made that the input provided by the user will be generally localized within region 354.

Figure 3B:
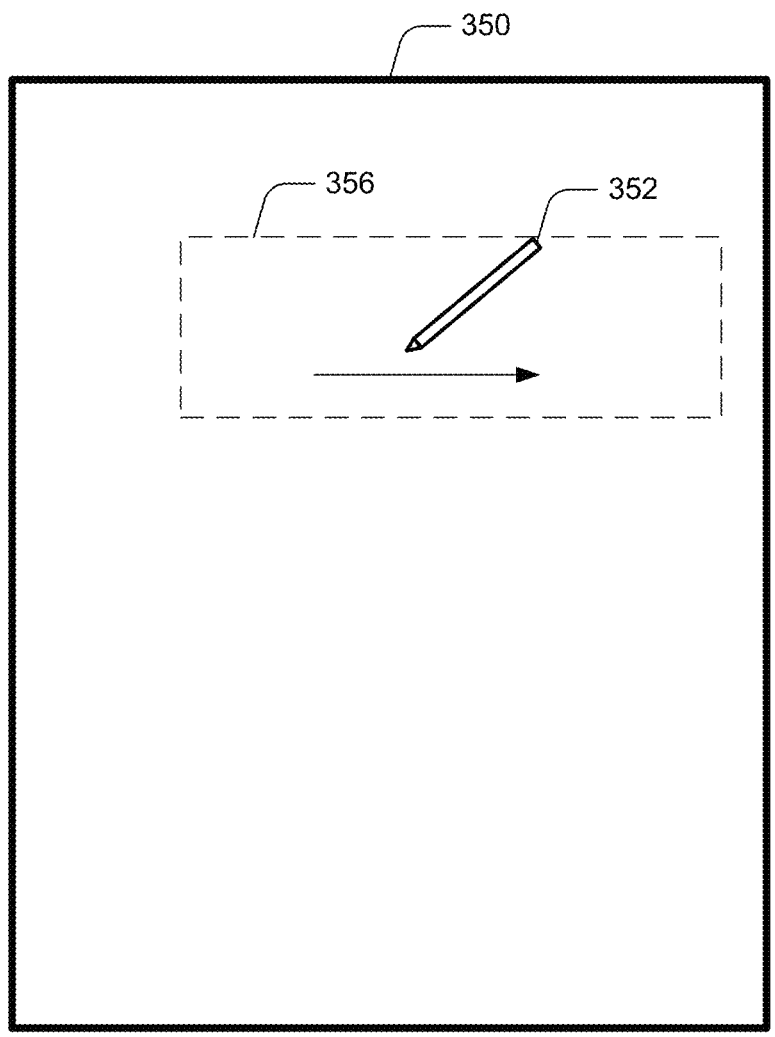

As another example, consider FIG. 3B which represents active portion 350 of the corresponding sensing panel. In this example, a stylus 352 has been touched down on active portion 350 and is moving in the direction of the arrow, as would be the case in the event the user was writing on the active portion. When the stylus 352 (or alternatively, a finger) is touched down and moved in a particular direction, the location of the touch input is determined by the computing device. The location of touch down and the corresponding direction of movement can then be used to define a region, such as region 356, within which the touch down and movement occurs. Once this region is defined, capacitive lines having portions that lie within this region can be scanned, while capacitive lines that lie outside this region are not scanned. In this particular embodiment, an assumption is made that the input provided by the user will be generally localized and will continue to be provided in the direction of movement within region 356. In this manner, the computing device or, more accurately, the touch contact application uses a so-called predictive mode which predicts future locations where input is likely to be provided. Based on the future locations developed by the predictive mode, associated capacitive lines can be selectively enabled and scanned.

With respect to the predictive mode, the touch contact application can also be configured to analyze a user's writing input and define a corresponding region, such as region 356, to selectively enable and scan capacitive lines within the region. For example, the touch contact application may ascertain that a user is writing or is about to write the letter "T". As such, capacitive lines can be scanned to capture the downstroke vertical portion of the letter, and then capacitive lines can be scanned to capture the cross stroke horizontal portion of the letter. As another example, a user may write a word which has the letter "i" in it. Typically, when a user writes a word in cursive that includes the letter "i", they finish the word and then returned to provide the dot over the "i". In this manner, in the predictive mode, when the user lifts the stylus after completing the word, but before providing the dot, scanning can be terminated on the capacitive lines corresponding to the word. Scanning can then predictively be performed on the capacitive lines corresponding to where the dot should occur.

In other embodiments, the predictive mode can also enable scan regions based on movement of the stylus. For example, many styluses include sensors such as accelerometers and gyroscopes. Based on the movement of the stylus, such information can be conveyed to the computing device, as described below, and the touch contact application can predictively define a scan region within which to scan for input.

Having considered various extensions in accordance with one or more embodiments, consider now an example stylus and an example computing device that can implement embodiments that reduce power consumption in a mobile stylus system.

Example Stylus

Figure 4:
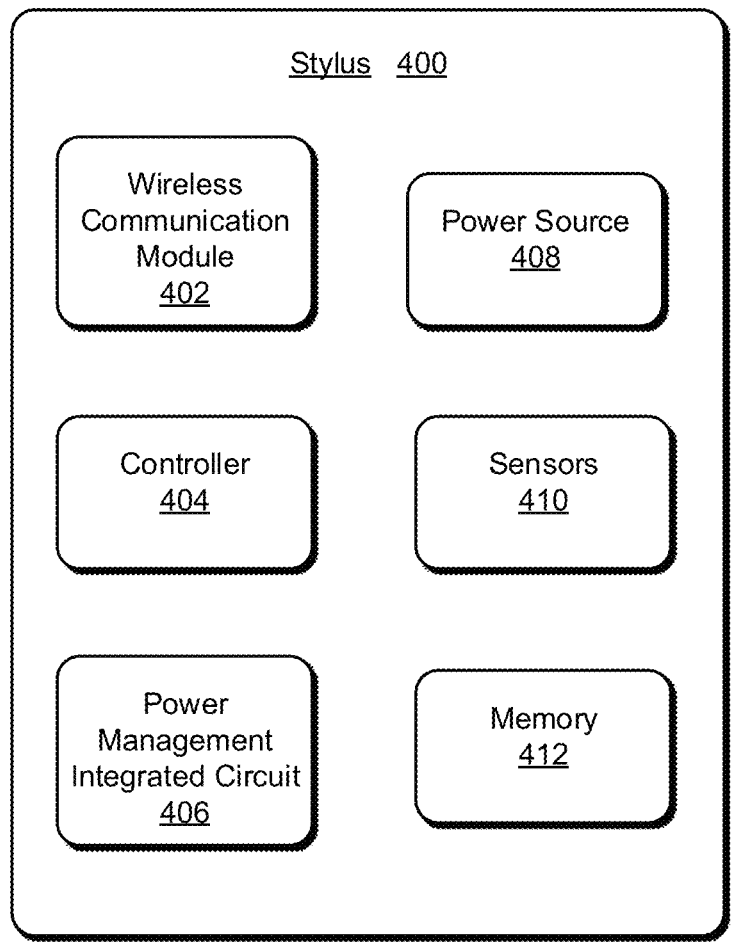
FIG. 4 illustrates an example stylus including various components in accordance with one or more embodiments.

FIG. 4 illustrates an example internal components of example stylus 400 in accordance with one or more embodiments. In this example, stylus 400 includes a wireless communication module 402, a controller 404, a power management integrated circuit 406, a power source 408, one or more sensors 410, and memory 412.

In particular embodiments, one or more internal components may be configured to provide for interaction between stylus 400 and a user or between a device and a user. By way of example and not limitation, interactions may include communication between stylus 400 and a device, enabling or altering functionality of stylus 400 or a device, providing feedback to or accepting input from one or more users, permitting power management activities such as communicating various information to a computing device to permit power management, and the like.

The wireless communication module 402 enables the stylus 400 to wirelessly communicate with a computing device, as described above and below. The wireless communication module 402 can employ any suitable type of technology to enable communication including, by way of example and not limitation, Bluetooth, Wi-Fi, RFID (both active and passive), cellular, RSSI (Received Signal Strength Indication), and the like.

Controller 404 may be a microcontroller or any other type of processor suitable for controlling the operation of stylus 400. Controller 404 may include one or more integrated circuits (ICs)—such as, for example, general-purpose microprocessors, microcontrollers, PLDs, PLAs, or ASICs. Controller 404 may include a processor unit, a drive unit, a sense unit, and a storage unit. The drive unit may supply signals to electrodes of the stylus's tip through a center shaft in the stylus. The drive unit may also supply signals to control or drive sensors 410 or one or more external components of stylus 400. The sense unit may sense signals received by electrodes of the stylus's tip through the center shaft, and may provide measurement signals to the processor unit representing input from a device. The sense unit may also sense signals generated by sensors 410 or one or more external components and provide measurement signals to the processor unit representing input from a user.

The processor unit may control the supply of signals to the electrodes of the stylus's tip and process measurement signals from the sense unit to detect and process input from the device. The processor unit may also process measurement signals from sensors 410 or one or more external components.

The power management integrated circuit 406 is the power manager for the described system. As such, the power management integrated circuit can perform power management operations by providing information that can be conveyed to a corresponding computing device, to assist the computing device in reducing its power consumption. For example, in at least some embodiments, input received from the sensors 410 indicating that the stylus is in contact with or hovering in an operational location adjacent the computing device can be conveyed by the power management integrated circuit 406 to the computing device so that the computing device can be placed in pen mode as described above. In this manner, the computing device may be relieved of having to ascertain whether the input it receives is from a stylus or a finger. Furthermore, in at least some embodiments, various services can register with the power manager integrated circuit and the power manager integrated circuit can turn on/off various other circuits in the system depending on system conditions. The power manager integrated circuit is also responsible for managing or placing the device, i.e. pen or stylus, into a sleep mode based on registered services voting for sleep mode, off mode, on mode and the like. In some instances, the power manager integrated circuit can also receive input from an accelerometer/gyroscope that will wake the pen up based on movement or angle of the pen.

Power source 408 may be any type of stored-energy source, including electrical or chemical-energy sources, suitable for powering the operation of stylus 400. In particular embodiments, power source 408 may be charged by energy from any suitable source such as a device. As an example and not by way of limitation, power source 408 may be a rechargeable battery that may be charged by motion induced on stylus 400. In other particular embodiments, power source 408 of stylus 400 may provide power to or receive power from a device. As an example and not by way of limitation, power may be inductively transferred between power source 408 and a power source of the device.

Stylus 400 may include one or more sensors 410, such as touch sensors, gyroscopes, accelerometers, contact sensors, or any other type of sensor that detects or measures data about the environment in which stylus 400 operates. Sensors 410 may detect and measure one or more characteristic of stylus 400, such as acceleration or movement, orientation, contact, pressure on the outer body, force on the tip, vibration, or any other suitable characteristic of stylus 400. The sensors may also be implemented so that their data can be read by an RFID interrogator on a corresponding computing device. As an example and not by way of limitation, sensors 410 may be implemented mechanically, electronically, or capacitively. Data detected or measured by sensors 410 communicated to controller 404 may initiate a pre-determined function or gesture to be performed by stylus 400 or the device. In particular embodiments, data detected or received by sensors 410 may be stored in memory 412. Memory 412 may be any form of memory suitable for storing data in stylus 400. In other particular embodiments, controller 404 may access data stored in memory 412. As an example and not by way of limitation, memory 412 may store programming for execution by the processor unit of controller 404. As another example, data measured by sensors 410 may be processed by controller 404 and stored in memory 412.

The memory 412 may store programming for execution by the controller 404, including programming for controlling the drive unit to supply signals to the electrodes of the stylus tip, programming for processing measurement signals from the sense unit corresponding to input from the device, programming for processing measurement signals from sensors 410 or external components to initiate a pre-determined function or gesture to be performed by stylus 400 or the device, and other suitable programming, where appropriate. As an example and not by way of limitation, programming executed by controller 404 may electronically filter signals received from the sense unit.

Having considered an example stylus, consider now an example device that can be used to implement one or more embodiments.

Example Device

Figure 5:
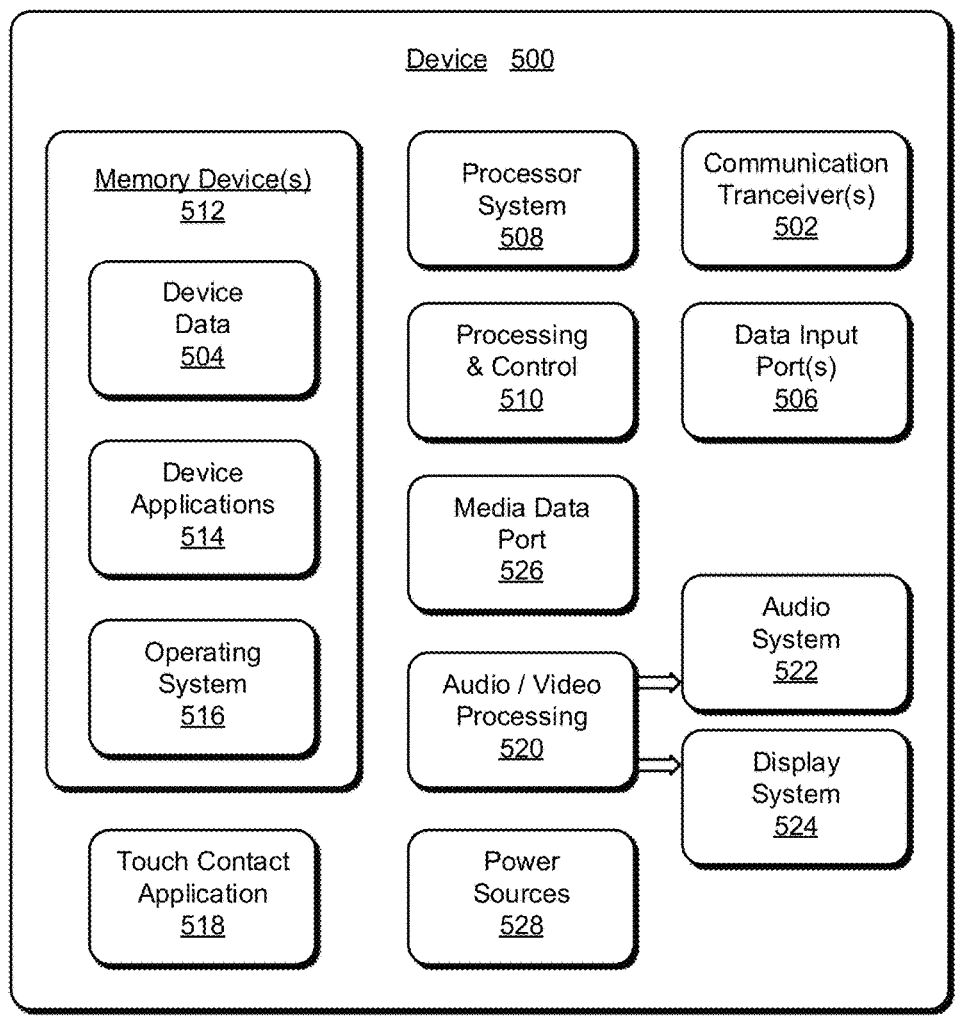
FIG. 5 illustrates various components of an example device that can implement various embodiments.

FIG. 5 illustrates various components of an example device 500 in which power consumption reduction embodiments can be implemented. The example device 500 can be implemented as any of the computing devices previously described, such as any type of client device, mobile phone, tablet, computing, communication, entertainment, gaming, media playback, and/or other type of device. For example, the computing device 102 shown in FIG. 1 may be implemented as the example device 500.

The device 500 includes communication transceivers 502 that enable wired and/or wireless communication of device data 504 with other devices. Additionally, the device data can include any type of audio, video, and/or image data. Example transceivers include wireless personal area network (WPAN) radios compliant with various IEEE 802.15 (Bluetoot™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified at 510. Processor system 508 can also include a power management integrated circuit (e.g., power management module 113 in FIG. 1) as described above. The device 500 may further include any type of a system bus or other data and command transfer system that couples the various components within the device. A system bus can include any one or combination of different bus structures and architectures, as well as control and data lines.

The device 500 also includes computer-readable storage memory or memory devices 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes a touch contact application 518 that implements power consumption reduction embodiments as described above, and may be implemented with hardware components and/or in software, such as when the device 500 is implemented as the computing device 102 described with reference to FIG. 1. An example of the touch contact application 518 is the touch contact application 112 that is implemented by the computing device 102.

The device 500 also includes an audio and/or video processing system 520 that generates audio data for an audio system 522 and/or generates display data for a display system 524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. In implementations, the audio system and/or the display system are integrated components of the example device. Alternatively, the audio system and/or the display system are external, peripheral components to the example device.

The device 500 can also include one or more power sources 528, such as when the device is implemented as a mobile device. The power sources may include a charging and/or power system, and can be implemented as a flexible strip battery, a rechargeable battery, a charged super-capacitor, and/or any other type of active or passive power source.

Although power consumption reduction embodiments have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for reducing power consumption in a mobile stylus system comprising:
   determining, by a computing device comprising part of the mobile stylus system, whether a wireless stylus is detected;
   responsive to a wireless stylus not being detected, configuring a capacitive sensing grid to be in a finger mode in which less than all components of the capacitive sensing grid are scanned to sense touch input from a user's finger; and
   responsive to a wireless stylus being detected, configuring the capacitive sensing grid to be in a pen mode to scan more components of the capacitive sensing grid than when the touch circuit is in the finger mode.

2. The method as recited in claim 1, wherein configuring the capacitive sensing grid to be in the finger mode enables every other capacitive line in each row and column of the capacitive sensing grid to be scanned.

3. The method as recited in claim 1, wherein configuring the capacitive sensing grid to be in the pen mode enables all capacitive lines in each row and column of the capacitive sensing grid to be scanned.

4. The method as recited in claim 1, wherein configuring the capacitive sensing grid to be in the finger mode enables every other capacitive line in each row and column of the capacitive sensing grid to be scanned; and wherein configuring the capacitive sensing grid to be in the pen mode enables all capacitive lines in each row and column to be scanned.

5. The method as recited in claim 1, wherein scanning of the components of the capacitive sensing grid accommodates a self-capacitance mode and a mutual-capacitance mode.

6. The method as recited in claim 1, wherein configuring the capacitive sensing grid to be in the pen mode is performed also responsive to detecting a stylus touch by the capacitive sensing grid.

7. The method as recited in claim 1, further comprising responsive to detecting a lift off of either a user's finger or the wireless stylus, ascertaining whether the wireless stylus is detected.

8. The method as recited in claim 1, further comprising responsive to detecting a touch down of either a stylus or a finger, defining a region within which capacitive lines of the capacitive sensing grid are scanned.

9. The method as recited in claim 1, further comprising responsive to detecting a touch down of either a stylus or a finger, and a direction of movement of the stylus or finger, defining a region within which capacitive lines of the capacitive sensing grid are scanned.

10. A computing device comprising:
one or more processors;
a touchscreen configured to receive touch input;
a capacitive sensing panel, operably coupled to the touch screen, and comprising a plurality of capacitive lines configured to be scanned to detect touch input;
a wireless communication module configured to wirelessly detect a stylus; and
a power management module configured to operate under the influence of the one or more processors, and configured to perform operations comprising:
determining whether a wireless stylus is detected by the wireless communication module;
responsive to a wireless stylus not being detected, configuring the capacitive sensing panel to be in a finger mode in which less than all of the capacitive lines of the capacitive sensing panel are scanned to sense touch input from a user's finger; and
responsive to a wireless stylus being detected, configuring the capacitive sensing panel to be in a pen mode to scan more capacitive lines of the capacitive sensing panel than when the capacitive sensing panel is in the finger mode.

11. The computing device as recited in claim 10, wherein configuring the capacitive sensing panel to be in the finger mode enables every other capacitive line in each row and column of the capacitive sensing panel to be scanned.

12. The computing device as recited in claim 10, wherein configuring the capacitive sensing panel to be in the pen mode enables all capacitive lines in each row and column of the capacitive sensing panel to be scanned.

13. The computing device as recited in claim 10, wherein configuring the capacitive sensing panel to be in the finger mode enables every other capacitive line in each row and column of the capacitive sensing panel to be scanned; and wherein configuring the capacitive sensing panel to be in the pen mode enables all capacitive lines in each row and column of the capacitive sensing panel to be scanned.

14. The computing device as recited in claim 10, wherein scanning of the capacitive lines accommodates a self-capacitance mode and a mutual-capacitance mode.

15. The computing device as recited in claim 10, wherein configuring the capacitive sensing panel to be in the pen mode is performed also responsive to detecting a stylus touch by the capacitive sensing panel.

16. The computing device as recited in claim 10, further comprising responsive to detecting a lift off of either a user's finger or the wireless stylus, ascertaining whether the wireless stylus is detected.

17. The computing device as recited in claim 10, further comprising responsive to detecting a touch down of either a stylus or a finger, defining a region within which capacitive lines of the capacitive sensing panel are scanned.

18. The computing device as recited in claim 10, further comprising responsive to detecting a touch down of either a stylus or a finger, and a direction of movement of the stylus or finger, defining a region within which capacitive lines of the capacitive sensing panel are scanned.

19. A system, comprising:
a stylus;
one or more processors;
a touchscreen configured to receive touch input;
a capacitive sensing panel, operably coupled to the touch screen, and comprising a plurality of capacitive lines configured to be scanned to detect touch input;
a wireless communication module configured to wirelessly detect the stylus; and
a power management module configured to operate under the influence of the one or more processors, and configured to perform operations comprising:
determining whether a wireless stylus is detected by the wireless communication module;
responsive to a wireless stylus not being detected, configuring the capacitive sensing panel to be in a finger mode in which less than all of the capacitive lines of the capacitive sensing panel are scanned to sense touch input from a user's finger; and
responsive to a wireless stylus being detected, configuring the capacitive sensing panel to be in a pen mode to scan more capacitive lines of the capacitive sensing panel than when the capacitive sensing panel is in the finger mode.

20. The system as recited in claim 19, wherein the stylus is an active stylus.

* * * * *